(No Model.)
F. STAFFORD.
HARVESTING KNIFE.
No. 311,792. Patented Feb. 3, 1885.
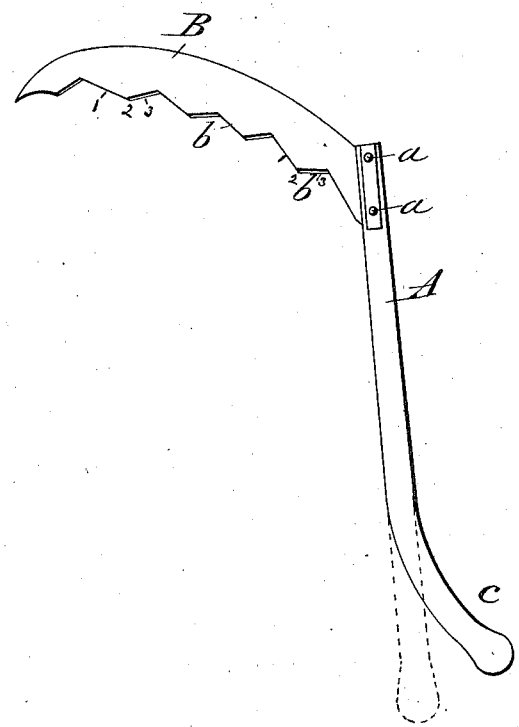
Attest:
F. H. Schott
A. R. Brown
Inventor:
Frank Stafford
C. H. Watson & Co, atty

UNITED STATES PATENT OFFICE.

FRANK STAFFORD, OF AUBURN, NEW YORK.

HARVESTING-KNIFE.

SPECIFICATION forming part of Letters Patent No. 311,792, dated February 3, 1885.

Application filed June 16, 1882. (No model.)

*To all whom it may concern:*

Be it known that I, FRANK STAFFORD, a citizen of the United States, residing at Auburn, in the county of Cayuga and State of New York, have invented certain new and useful Improvements in Harvesting-Knives; and I do declare the following to be a full, clear, and exact description of the invention, such as will enable others skilled in the art to which it appertains to make and use the same, reference being had to the accompanying drawing, and to the letters and figures of reference marked thereon, which form part of this specification.

This invention relates to an improvement in harvesting-knives for cutting corn, sugar-cane, grass, rice, brush, bushes, weeds, &c., its object being to produce a knife or hook by means of which the cutting is done rapidly and effectively, and with the expenditure of less power than is required in the operation of the ordinary harvester-knife; and to this end it consists of a peculiarly-shaped handle and blade, as will be hereinafter more fully set forth.

It has heretofore been customary, so far as I am informed, to make use of a curved or st.aight bladed knife for harvesting purposes, provided with teeth similar in all respects to the teeth of an ordinary wood-saw. Such an article is shown and illustrated in Knight's Mechanical Dictionary. It is well known, however, that the teeth of an ordinary wood-saw are made very close together and very sharp-pointed, the only cutting that can possibly be executed by a harvesting-knife thus arranged being done by the extreme points of the teeth. Experience and actual tests have demonstrated that harvesting-knives made in this way are impracticable; the points of the teeth stick in the cornstalk, and require considerable strength and time for harvesting purposes. Moreover, the cutting of the corn, &c., is sawed rather than performed by a cutting operation, as is really necessary and required for doing the work easily and quickly, and without any undue exertions on the part of the operator.

I have discovered, after numerous experiments and tests, in order to expedite harvesting corn and the like, and to render the work comparatively light and easy, that it is eminently important that the operation should be performed by an instrument that will make a clean cut, in contradistinction to a saw or irregular cut, and it is in this particular that the great advantage is claimed for my improved knife. To this end I have devised a curved knife-blade provided with a series of graduated teeth or steps so pitched and arranged that shoulders will be provided on the blade for holding the stalks of the plants to be cut in place on said blade, so that they will not move longitudinally thereof, while at the same time continuous unserrated cutting-edges will be formed, by which the stalks, held as described, may be cleanly and easily severed with small expenditure of power.

The annexed drawing shows a side view of my improved cutting knife or hook.

The handle A of the knife has secured to it at an obtuse angle, by rivets $a$ or other suitable means, the cutting-blade B, which is a curved steel blade, the edge of which, instead of being a single continuous cutting-edge, is composed of several edges or a series of short graduated steps or teeth, $b$. The distance between the points of the teeth is such as to admit between them a stalk of corn or cane of the average size. The blade, not being set at a right angle to the handle, but at an obtuse angle, as described, would, if of the ordinary construction, permit the stalk to slide longitudinally upon it when the implement is pulled in the direction of the handle. This is prevented by making the teeth with their points at such distance apart as to admit between them stalks of the average thickness. The teeth should not be acutely pointed, as in such case they will enter and stick in the stalk without cutting it. If, however, they are made with their edges at an obtuse angle, as at 2, to each other, and of such size or distance apart as to admit the stalk, each stalk, while held from longitudinal motion along the blade, is also subjected to the action of a continuous cutting-edge. This action is the same whether the implement is swung toward the left and the cut is made with the edges 1, or drawn toward the operator so as to cut with the edges 3. The contiguous edge, which, on account of the motion of the sickle, has little or no cutting action, serves as the shoulder referred to, by which the stalk is maintained in position on the cutting-edge. This handle A is preferably made of wood, but may be of metal and more or less bent or curved outward at c, its lower or furthest end, from the blade; or it may, if desired, be straight, as shown by the dotted lines in the figure.

The advantages claimed for a cutter or hook made in this manner over the ordinary knife with a long continuous cutting-edge and with a straight handle are, that with the improved cutter, the short cutting edges or teeth b standing at an angle with the line of draft as applied to the end of the handle, and being brought into contact with the standing corn-stalks, brush, or grain, the cutting is done much more rapidly and effectively, and with less power. Again, the curve or bend c in the handle, which is grasped by the hand of the operator, affords a better and more convenient hold for the hand, and at the same time enables the operator to better guide and control the instrument by reason of the leverage thus gained. Again, by means of the bend, the hand is brought away from the direct line of draft, obviating the necessity of grasping the handle so tightly, thus relieving the muscles of the arm and wrist.

In throwing the implement to the right, so as to bring it into position ready for encircling the stalks to be cut, it is necessary with a straight handle to bend the wrist backward to a considerable extent, which repeated motion is very tiring to the muscles. With the bent handle which I have devised, however, the heel of the implement is carried some distance to the right while the wrist is straight, leaving a small motion only necessary to encircle the stalks.

I am aware that sickles have been made with a short straight handle and a blade curving around to the right in semicircular form, and I do not intend my claims to cover such construction, it being my object to throw the heel of the comparatively straight-bladed corn-cutter to the right by making a bend in its handle, which heretofore has been made straight.

Having thus described my invention, what I claim as new, and desire to secure by Letters Patent, is—

1. A harvesting implement consisting of a blade provided with two series of cutting-edges, the edges of one series being arranged at an obtuse angle to those of the other series, so as to form teeth, between the points of which the stalks of corn may be admitted, whereby said stalks may be held from motion lengthwise of the blade and acted upon by a continuous cutting-edge, in combination with a handle, whereby said blade is adapted to be used by hand, substantially as set forth.

2. A harvesting implement consisting of a blade provided with two series of cutting-edges, the edges of one series being arranged at an obtuse angle to those of the other series, so as to form teeth, between the points of which the stalks of corn may be admitted, whereby said stalks may be held from motion lengthwise of the blade and acted upon by a continuous cutting edge, in combination with a handle, whereby said implement is adapted to be used by hand, the handle having the backwardly-bent portion c, for the purposes described.

In testimony whereof I affix my signature in presence of two witnesses.

FRANK STAFFORD.

Witnesses:
R. A. DYER, Jr.,
THOMAS D. BOAK.